United States Patent [19]

Archer

[11] Patent Number: 4,527,941
[45] Date of Patent: Jul. 9, 1985

[54] EXPANDABLE SUPPORT STRUCTURE USABLE AS LOADING RAMP

[75] Inventor: Danny Archer, Mountain View, Ark.

[73] Assignee: VRP Partners, Ltd., Columbus, Ga.

[21] Appl. No.: 529,405

[22] Filed: Sep. 6, 1983

[51] Int. Cl.³ .............................................. B65G 67/02
[52] U.S. Cl. ..................................... 414/537; 182/48; 182/157
[58] Field of Search ............... 414/537; 14/69.5, 71.1, 14/72.5, 45, 73; 182/1, 157, 158, 48

[56] References Cited

U.S. PATENT DOCUMENTS

| | | | |
|---|---|---|---|
| 196,679 | 10/1877 | Lane | 182/157 |
| 597,706 | 1/1898 | Brown | 182/95 |
| 600,281 | 3/1898 | Garland | 182/157 |
| 713,561 | 11/1902 | Doyen | 14/45 |
| 877,363 | 1/1908 | Nielsen | 182/81 |
| 960,022 | 5/1910 | Kelemen et al. | 14/45 |
| 1,760,422 | 5/1930 | Mackie | 280/166 |
| 2,575,615 | 11/1951 | Crump | 182/95 |
| 2,858,056 | 10/1958 | Ownby | 182/95 |
| 3,352,440 | 11/1967 | Wilson | 296/61 X |
| 3,462,170 | 8/1969 | Smith et al. | 280/166 |
| 3,493,077 | 2/1970 | Donten | 182/95 |
| 3,642,156 | 2/1972 | Stenson | 296/61 X |
| 3,713,553 | 1/1973 | Curtis et al. | 296/61 X |
| 3,756,440 | 9/1973 | Raap et al. | 296/61 X |
| 3,870,170 | 3/1975 | Noble et al. | 414/537 |
| 3,976,209 | 8/1976 | Burton | 296/61 X |
| 4,290,728 | 9/1981 | Leduc | 414/537 |

FOREIGN PATENT DOCUMENTS

| | | | |
|---|---|---|---|
| 2507 | 6/1918 | Netherlands | 14/45 |
| 703415 | 12/1979 | U.S.S.R. | 14/71.1 |

Primary Examiner—Joseph E. Valenza
Assistant Examiner—Stuart J. Millman

[57] ABSTRACT

An expandable support structure including a pair of spaced-apart lazy tongs linkages acting as the load supporting beams of the structure and wherein the floor of the structure is formed by planks extending laterally between the two linkages; each adjacent pair of the planks is pivotally connected near a lower endwise junction of two of the links of the lazy tongs linkages, the pivot point of each plank being near an edge thereof with the other edge free to rotate upward as the linkage is contracted; the free ends of two adjacent planks are linked together to cause them to be lifted when the linkage is contracted and a slide mechanism guides these free ends upward. The apparatus is usable as a ramp for loading wheeled vehicles into the bed of a pickup truck and for such usage may be provided with a slide mounting in the rear of the bed of the pickup truck to reach over the tailgate hinge and at the same time allow the structure to be folded back completely within the pickup bed and the tailgate closed.

17 Claims, 8 Drawing Figures

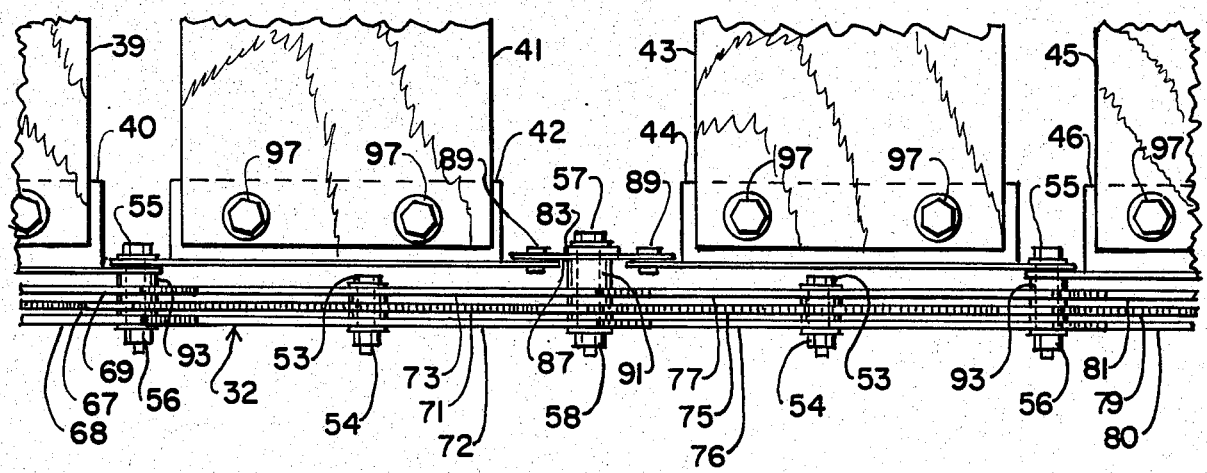
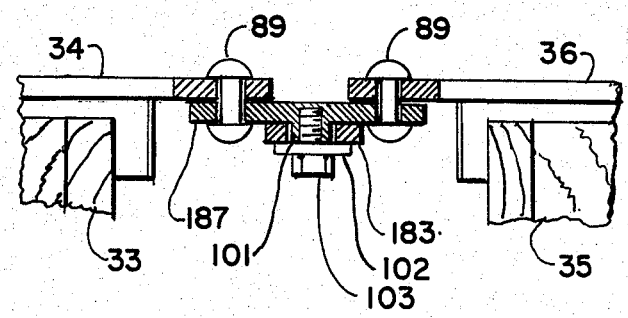
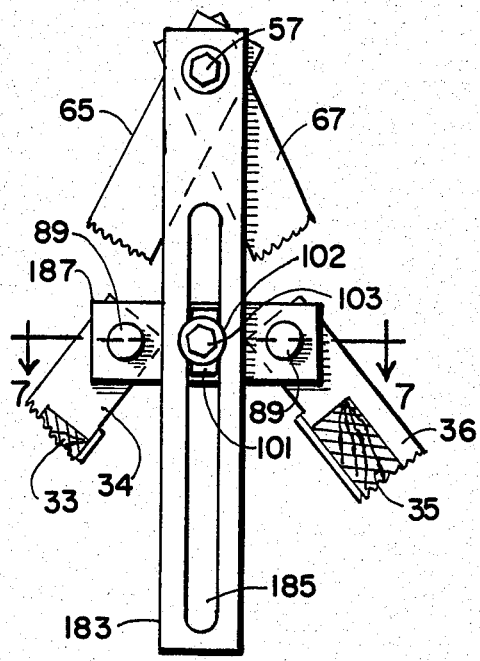
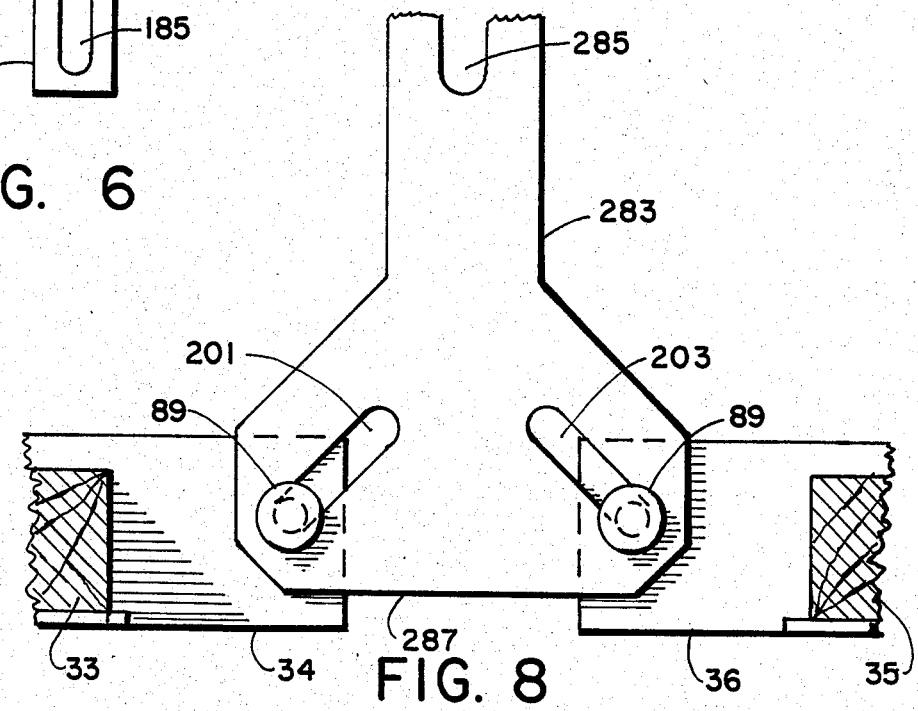

EXPANDABLE SUPPORT STRUCTURE USABLE AS LOADING RAMP

The present invention relates to expandable support structures such as loading ramps or the like and has particular utility in providing a loading ramp for a pickup truck or other load carrying vehicle. The size and construction of the specific embodiment is intended for loading three-wheel recreational vehicles in the back of a pickup truck; accordingly it has a width of about four feet and a load capacity of at least a thousand pounds. Obviously the apparatus could be scaled up or down or extended in an or all dimensions to suit a wide variety of purposes.

Loading ramps, of course, are well known and vary from simple makeshift plank arrangements to be spaced apart a distance equal to vehicle wheel spacing up to rather complicated foldable or otherwise articulated load ramp devices. Various folding and retracting loading ramps are shown for example in U.S. Pat. No. 3,870,170 dated Mar. 11, 1975 to Noble et al., U.S. Pat. No. 3,713,553 dated Jan. 30, 1983 to Curtis et al., U.S. Pat. No. 3,352,440 dated Nov. 14, 1967 to Wilson, and U.S. Pat. No. 4,290,728 dated Sept. 22, 1981 to Leduc.

The above patents indicate a recognition of the existence of a problem in connection with a convenient ramp structure for loading a pickup truck or similar vehicle, but the proposed solutions in the above patents do not in any way resemble applicant's apparatus.

Applicant's apparatus makes use of the well known expandable characteristic of a lazy tongs linkage, and two such linkages act as the support beams for the structure. The links are about one inch wide by one foot long. These are spaced apart somewhat less than the width of the truck bed, and wood floorboards, also referred to as planks, extend laterally between the two lazy tongs linkages. The floorboards are spaced apart about six inches center-to-center. The floorboards are coplanar or nearly so when the ramp is expanded and are arranged with a linkage which causes two adjacent floorboards to rotate oppositely from their angle of nearly 180° to an angle of about 10° as the linkage is contracted. In this manner the floorboards do not interfere with one another and occupy a sufficiently small space so that the lazy tongs linkage can be completely contracted. Once contracted, the ramp is about one foot in length and is turned upright to occupy a space in the end of the pickup bed only about one foot high and less than about a foot of the length of the pickup truck bed. The width occupied depends of course on the width of the expandable ramp structure.

As shown and described, the ramp is about 4 feet long in the expanded configuration and will support a vehicle and rider weight of over one thousand pounds. For a pickup truck bed of an average height the ramp angle would be less than 45° and easily negotiated by a three-wheel all-terrain vehicle. In the illustrated embodiment the floor boards are one inch by four inch wood planks which are more than adequate to support a three-wheel vehicle because the greatest part of the weight is on the wheels which are relatively close to the lazy tongs linkage acting as the truss for the ramp. Reinforced floorboards or planks could be used in other applications of the ramp.

Throughout this explanation and description and in the appended claims the term plank will be understood to have a very broad and general scope to include members of any material, including wood or metal or reinforced plastic, set as beams between the two lazy tongs linkages. In shape the planks may have a solid rectangular cross section, a channel or U-shape cross section or be made in the form of a box beam or any other convenient structural shape.

It will also be apparent that a ramp for use by four-wheel vehicles may take the form of two narrow ramps, one for each wheel track. Also a ramp may have more than two lazy tongs linkages, for example a third lazy tongs linkage may be placed in the center of the ramp supporting planks on the right and the left.

In addition to providing the above described features and advantages, it is an object of the present invention to provide an expandable and contractable ramp structure having floorboards of planks which are supported at their ends by a lazy tongs linkage and are arranged to assume a generally coplanar position in the expanded configuration and to rotate approximately 90° as the lazy tongs linkages contract.

It is another object of the present invention to provide such a ramp with lazy tongs linkage supports wherein the floorboards of planks are arranged in pairs with the outer edges of the planks pivotally supported at a lower linked joint of the lazy tongs linkage and with the inner edges of the pairs connected together and supported by a link connected to an upper junction of two links of the lazy tongs linkage.

It is still another object of the present invention to provide a ramp with floorboards supported by lazy tongs linkages on their ends wherein contraction of the lazy tongs linkage causes inner connected edges of the planks to be forced upward so that the planks assume a compact arrangement allowing the linkage to be completely contracted.

Other objects and advantages of the present invention will be apparent from consideration of the following description in conjunction with the appended drawings in which:

FIG. 5 is a top plan enlarged fragmentary view of a portion of the apparatus of FIG. 1;

FIG. 6 is a sectional fragmentary view showing an alternative form of hanger link for use in the apparatus of FIGS. 1-5;

FIG. 7 is a horizontal sectional view of the apparatus of FIG. 6; and

FIG. 8 is an enlarged sectional fragmentary view showing second alternative form of hanger link for use in the apparatus of FIGS. 1-5.

Figure 1:
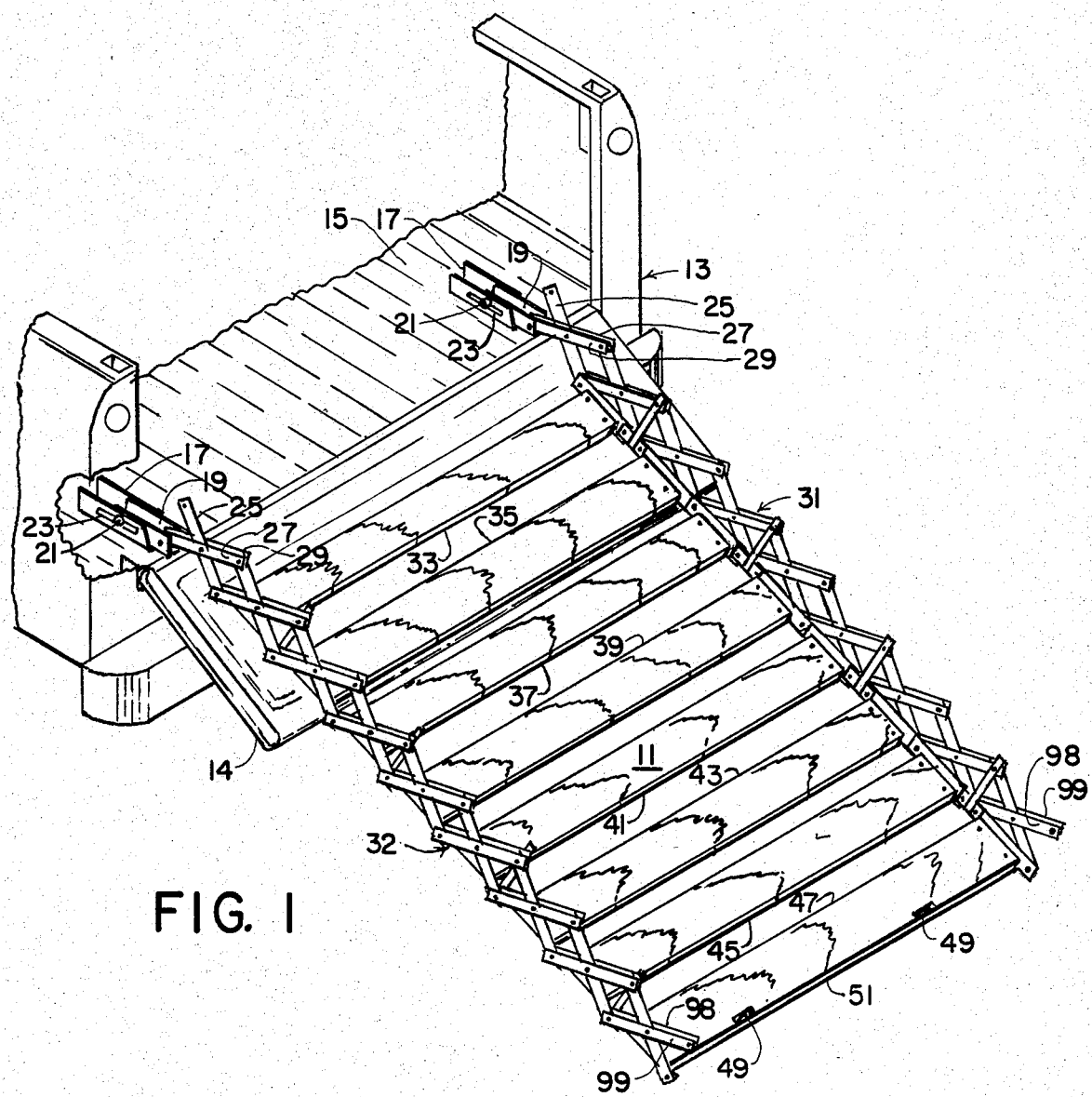
FIG. 1 is an isometric view of an expandable ramp according to the invention in the expanded position.
Figure 2:
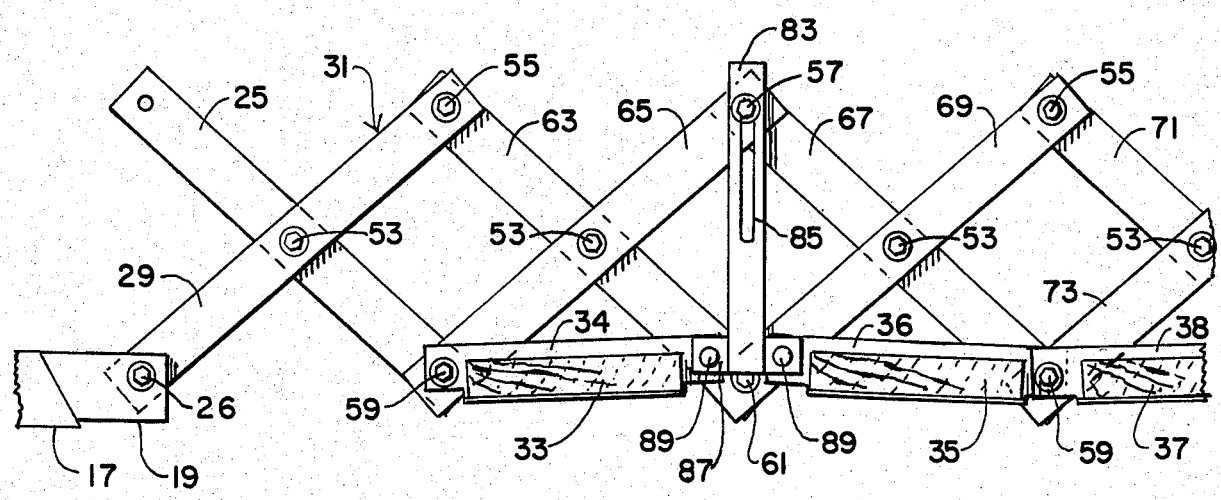
FIG. 2 is an enlarged fragmentary sectional view of a portion of the apparatus of FIG. 1.

Referring now to the drawings and particularly FIGS. 1 and 2, the support structure or loading ramp 11 according to the invention includes a pair of lazy tongs linkages 31, 32 which act as trusses or beams to give the structure good load-bearing capability. The floor of the ramp is formed by a plurality of planks 33, 35, 37, 39, 41, 43, 45, and 47.

Ramp 11 is mounted in the back of pickup truck 13 with limited sliding movement provided by channel members 17 having channel member 19 slidably retained therein and by means of slots 23 which are engaged by bolts 21 secured to channel member 19. The sliding motion provided by this arrangement is an optional feature to avoid interference with the tailgate 14 of pickup truck 13 when ramp 11 is lowered.

Channel members 17 are secured by bolting to the bed 15 of pickup truck 13, and the end links 27 and 29 of the lazy tongs linkages 31 and 32 are pivotally bolted in the outboard ends of channel members 19. It will be understood that while various fastening devices are described as bolts or rivets that the bolts described may be replaced by rivets in appropriate circumstances or by other fasteners and the same is true of the rivet fasteners.

As shown in FIG. 1, end links 25 of ramp 11 are the same as other corresponding links in the linkages and hence their free ends project upward and are unconnected to the other structure. These free ends could be removed and present a smoother appearance if desired, and the same is true of links 98 and 99 at the outer end of the ramp structure.

Figure 3:
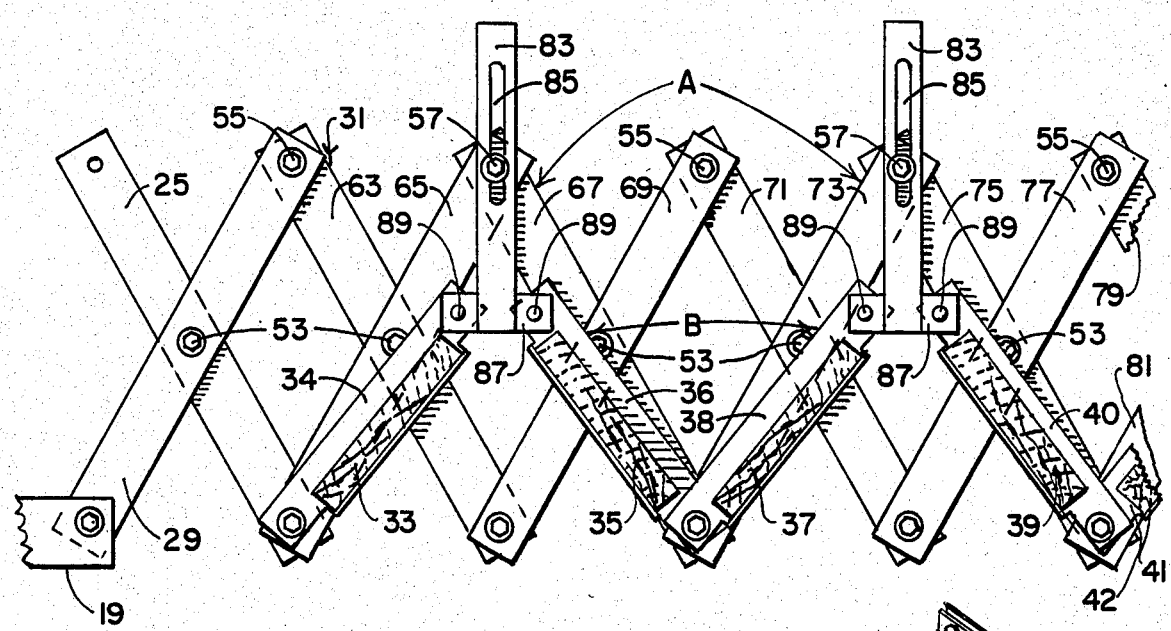
FIG. 3 is an enlarged fragmentary sectional view of a portion of the apparatus of FIG. 1 showing its position in the partly expanded configuration.

The details of the configuration of ramp 11 are better shown in FIG. 2, FIG. 3, and FIG. 5. FIG. 2 shows the links as they are arranged in the extended position of ramp 11 illustrated in FIG. 1. Links 25, 29, 63, 65, 67, 69, and 71 and succeeding similar links form a conventional lazy tongs linkage. In the preferred embodiment links 29, 65, and 69 are paired with other links not shown in FIG. 2; this arrangement can be clearly seen in FIG. 5 and also in FIGS. 1 and 4. The purpose of the paired links is to give symmetry to each of the lazy tongs linkages and this has been found to avoid any tendency of the linkage to warp when it is under stress. The pairing of links as in the preferred embodiment may not always be necessary, and it will be apparent that the operation of the apparatus would be the same without paired links except for its response to stresses due to loading. It should also be noted that while all links have been shown of the same thickness in the illustrations, the doubled links such as 27, 29 may be made of approximately half the thickness of links such as 25 or may otherwise be of lesser size and strength. Furthermore the links of the lazy tongs linkages as shown are of simple rectangular cross section, but the links may be configured to reduce their weight and retain their strength in accordance with well-known engineering principles.

As further shown in FIG. 2 for example, the planks such as 33 and 35 are supported at their ends by planks support links 34 and 36 in the form of steel angles with an L-shaped cross section.

Links 34 and 36 are pivoted at their outer ends by virtue of nuts 59 which pass through holes (not numbered) in the ends of links 34 and 36. In the embodiment illustrated the bolts 59 also serve to pivotally connect links such as 67 and 73 at their lower ends. In some cases another plank support link such as 38 will also be pivoted on the same bolt 59. It appears that using one bolt as a pivot pin for three or four of the links is generally advantageous, but it is apparent that similar operation of the linkage could be achieved using separate bolts or pivot pins in nearly the same position.

It will be observed that bolt 61 and other similarly positioned bolts in the linkage do not act as a pivot pin for or give support to the links 34 and 36. Rather the free ends of links 34 and 36 are supported by a hanger link 83, which has welded or otherwise secured to its lower end a cross arm 87 and pivotal attachment of the links 34 and 36 is made to the cross arm 87 by rivets 89. The top of hanger link 83 is supported by a bolt 57 which also acts as a pivot pin for links 65 and 67. Bolt 57 passes through a slot 85 in link 83 so that link 83 may move upwardly a substantial distance from that shown in FIG. 2.

Referring now to FIG. 3 the linkage 31 is shown in its half contracted (or half expanded) position to show the operation of the linkage. It will be seen that the lazy tongs links 25, 29, 63, 65, 67, 69, 71, 73, 75, 77, 79, and 81 have changed position from a slightly obtuse angle relationship in FIG. 2 to an acute angle relationship in FIG. 3. This is the customary and well-known operation of a lazy tongs linkage as it contracts.

At the same time the planks support links 34, 36, 38, 40, and 42 started in FIG. 2 at an angle of approximately 180° and have assumed an angle of about 90° in FIG. 3. This counter rotation of links 34 and 36 is caused by the bolts 59 acting on their outer ends as the distance between such bolts diminishes with the contraction of the lazy tongs linkage. The pivot points represented by rivets 89 are slightly higher than the pivot points at bolts 59 and thus links 34 and 36 have their adjacent ends forced upward along with hanger link 83. It will be seen that it is essential that in the arrangement of FIGS. 2 and 3 rivets 89 be at a higher level than bolts 59 and this is assured by the appropriate positioning of slot 85, the upper end of which acts as a stop to prevent the ends of links 34 and 36 connected to cross arm 87 from dropping to a lower position. In FIG. 2 it will be seen that this arrangement results in the planks 33–47 being not quite coplanar and the floor of the ramp is thus not completely flat. This is not a serious disadvantage, and alternative form for link 83 would permit the floor to be exactly flat if that is an important consideration, as will later be described.

Bolts 55, 57, 59, and 61 are shown with integrally formed washers, and it will be generally desired that washers are provided separately or as part of the bolts or nuts for smoother and more reliable operation of the device. Washers or other spacers will be employed to provide clearance between the various links as required; this is illustrated in FIG. 5. It will be noted that FIG. 5 shows linkage 32 whereas FIGS. 2 and 3 show linkage 31, but it will be understood that one linkage is the mirror image of the other and corresponding links have the same reference number.

In FIG. 5 the ramp is expanded and planks 39, 41, 43, and 45 are nearly flat or coplanar. It will be noted that a generous distance is allowed between the planks in order to prevent interference between the planks when the linkage is contracting. Since the vehicles using the ramp are quite large-wheeled vehicles the spacing between the planks presents no difficulty and even allows dirt and mud to readily fall through the ramp so that it is not transported into the pickup truck or does not foul the contraction motion of the ramp. In other applications of the support structure the planks could be arranged to be spaced considerably closer together although minimal spacing is desired for parts clearance and easy operation.

The flange-like shape of links 40, 42, 44, and 46 is readily seen in FIG. 5, and also the attachment of planks 39, 41, 43, and 45 to such links with bolts 97 is shown. It should be understood that making the planks 39, 41, 43, and 45 and the links 40, 42, 44, and 46 separate elements is a matter of convenience rather than functional necessity. It is apparent that the planks could be made of steel appropriately reinforced with ribs or flanges and the ends of the planks could then serve in place of the plank support links 40, 42, 44, and 46.

As previously mentioned, the linkage may be provided with washers to separate adjoining links in order that binding and wearing of painted surfaces is minimized in accordance with conventional mechanical design. In addition to such washers it is convenient to have spacers such as 93 to provide clearance between the plank support links such as 42 and the heads of bolts 53. Similar spacers 91 are provided for positioning hanger 83 in alignment with plank support links 42 and 44, for example. It will be apparent that spacing may also be controlled by the use of special shouldered bolts or rivets.

Also in FIG. 5 one can most readily see the doubling of certain of the lazy tongs links for reasons previously described. Note that links 69, 73, 77, and 81 are doubled respectively by links 68, 72, 76, and 80 whereas links 67, 71, 75, and 79 are single links. Accordingly all of the link pivot points have a pair of outer links and one center link so that forces are symmetrically distributed and any warping of the link members is avoided. All links are of ¼ inch by 1 inch common steel bar stock, in the illustrated embodiment.

Figure 4:
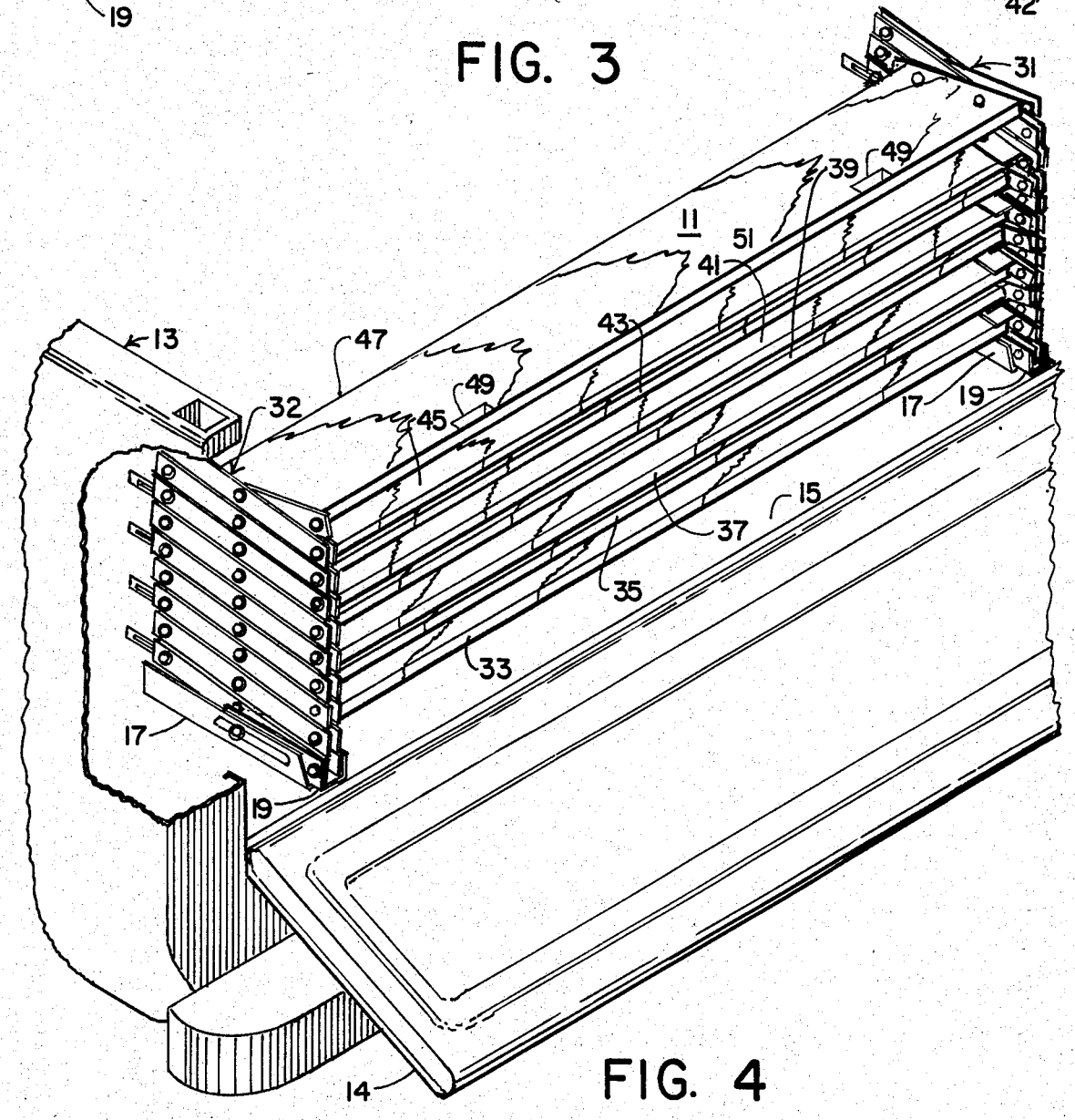
FIG. 4 is an isometric view showing the apparatus of FIG. 1 completely contracted and stored.

FIG. 4 shows the ramp 11 completely contracted and folded to its storage position in the back of the bed 15 of the pickup truck 13. Folding of the ramp from the position of FIG. 1 to the position of FIG. 4 is accomplished by grasping the outer edge of the end plank 47 and pushing toward the pickup truck 13 to collapse the lazy tongs linkage. Hand holds 49 are provided in the edge of plank 47 and a metal reinforcement bar 51 runs along the edge of plank 47; it is attached by screws which are not shown. It will be seen from FIG. 4 that the contracted ramp occupies less than a foot of the end space of the pickup bed 15 and the height of the ramp when contracted is somewhat less than a foot for an eight-plank ramp as shown. Accordingly the ramp 11 could be made longer by adding additional planks and linkage sections without extending above the tailgate 14 of the truck 13. The width of ramp 11 is essentially limited only by the width of truck bed 15 and, of course, the ramp may be made as narrow as desired for a particular use. In other uses the ramp could be advantageously made expandable in width as well as in length by the simple expedient of making all the planks such as 47 of telescoping construction.

It should be pointed out that the support structure according to the invention has potential uses other than as a ramp with a substantially flat floor. Note in FIG. 3 for example that by modifying the hanger links 83 the position as shown in FIG. 3 could be made to be the maximum extended position of the structure. Alternate planks would then be at approximately 90° and with the structure arranged as shown in FIG. 1 planks 33, 37, 41, and 45 would be approximately parallel to the ground surface and would be usable as steps. Planks 35, 39, 43, and 47 would be in a position of risers for the steps and could either be retained or could be eliminated. As a further variation the ramp structure illustrated in FIGS. 1-5 could be arranged to take either the form of a ramp as shown or the form of steps as described above. In such a structure the planks may be made wider thus narrowing the gap between planks and the gaps in the structure. Such an arrangement would find use for loading animals, as well as possible use for human passengers in mass transit vehicles or the like. While the illustrated structure is manually expanded and contracted, hydraulic or pneumatic cylinders could be employed for powered operation.

FIG. 6 and FIG. 7 show a modification for the structure of FIGS. 1-5 which involves replacement of hanger link 83 with a different form of link 183 having a separate cross arm 187.

Link 183 is provided with a slot 185 at the bottom of the link and is provided with a simple pivot attachment to pivot about bolt 57 at the top. Cross arm 187 is provided with a slider 101 which engages slot 185 so that cross arm 187 is free to slide up and down in slot 185 but is restrained from rotating with respect to hanger link 183. Cross arm 187 is secured to link 183 by bolt 103 and washer 102. Bolt 103 is illustrated as being threaded into a tapped hole (not shown) in slider 101, but of course a through bolt or rivet or the like could be utilized in place of bolt 103.

It will be seen that the operation of the apparatus modified as shown in FIGS. 6 and 7 will be nearly identical with that previously described for the apparatus of FIGS. 1-5 except that the sliding motion takes place between cross arm 187 and hanger 183 rather than taking place at the top of hanger 83 with respect to bolt 57 and links 65 and 67. The modification of FIGS. 6 and 7 requires additional separate parts, but it has the advantage of eliminating the projection of the top of hangers 83 as the structure is contracted; this projection may be seen in FIG. 3 and in FIG. 4.

A further variation in the apparatus according to the invention is illustrated in FIG. 8. As previously explained with respect to the principal embodiment, facility in collapsing the structure requires that the planks supporting links such as 34 and 36, and in most cases the planks such as 33 and 35, be oriented at slightly less than 180° with the consequence that the floor of the ramp is not perfectly flat.

A perfectly flat floor and optimum facility in collapsing the structure can both be retained by use of a hanger link structure as illustrated in FIG. 8 at 283. Link 283 has a slot 285 which is essentially identical to slot 85 of link 83 and operates in the same fashion, however, the bottom portion 287 of link 283 is formed integrally and provided with slots 201 and 203 which replace the holes for rivets 89 in the principal embodiment. In apparatus provided with the hanger 283 the contraction of the lazy tongs linkage again causes a force to be applied tending to force together links 34 and 36, but in this case the links have some freedom of movement provided by slots 201 and 203 and the ends of the links are lifted upward as rivets 89 ride up in slots 201 and 203. This starts the motion of counter rotation of the links 34 and 36 and increases the lever arm which continues the rotation of links 34 and 36 and lifts hanger 283. Otherwise operation of the apparatus modified in accordance with FIG. 8 would correspond with that previously described for FIGS. 1-5. It may be further noted that the features of FIG. 8 may be combined with the features of FIGS. 6 and 7 to form still another modification that has the advantages of both previously described modifications.

In addition to the variations and modifications in the apparatus that have been described or suggested above, other modifications will be apparent to those of ordinary skill in the art and accordingly the scope of the invention is not to be considered to be limited to the particular embodiments shown or suggested but is rather to be determined by reference to the appended claims.

What is claimed is:

1. An expandable support structure comprising
at least two lazy tongs linkages each having at least eight links and arranged with corresponding links parallel and spaced apart by the structure width,
a plurality of plank support links, one end of each plank support link being pivotally connected to a lazy tongs linkage near an endwise junction of two of said links, there being two adjacent plank support links so pivotally connected near the same said endwise junction, the pivotal axes of said plank support links being perpendicular to the planes of said linkages,
a plurality of elongated planks arranged perpendicular to said linkages, at least one of each of said two adjacent plank support links having the end of one of said planks affixed thereto, and
means connected to said plank support links to cause said plank support links to be supported when said lazy tongs linkage is expanded with each said two adjacent plank support links at a first angle of between 180° and about 90°, said angle being greater than the angle between links of said lazy tongs linkages, and to cause said two adjacent plank support links to rotate oppositely to assume a second angle of between about 5° and about 30° when said linkage is contracted.

2. Apparatus as recited in claim 1 wherein alternate ones of the lower endwise junctions of said lazy tongs links each have two plank support links pivotally connected coaxially with said junction pivot axis.

3. Apparatus as recited in claim 1 wherein the last said means includes a link connected between said plank support links and connected to an upper endwise junction of two of said lazy tongs links with limited sliding movement relative thereto.

4. Apparatus as recited in claim 1 where at least some of said links of said lazy tongs linkage have matched therewith a similar link which is parallel thereto and has common pivotal connections.

5. Apparatus as recited in claim 1 wherein said first angle is between 180° and 160°.

6. Apparatus as recited in claim 1 wherein said second angle is between 5° and 30°.

7. An expandable support structure comprising
at least two lazy tongs linkages having a predetermined expansion direction each having at least four links and arranged with corresponding links parallel and spaced apart by the structure width,
a plurality of elongated planks arranged transversely to said linkages, each end of one edge of each said plank being pivotally connected to a respective lazy tongs linkage near an endwise junction of two of said links, the pivotal axes of said planks being transverse to the expansion direction of said linkages, and
means connected to said planks to cause said planks to be supported when said lazy tongs linkage is expanded with each said plank at an angle of between about 0° and about 45° with said expansion direction, said angle being less than the angle between each link of said lazy tongs linkage and said expansion direction, and to cause said planks to rotate to assume an angle of between about 60° and about 90° with said expansion direction when said linkage is contracted.

8. Apparatus as recited in claim 7 wherein the last said means includes a link connected between said planks and connected to an upper endwise junction of two of said lazy tongs links with limited sliding movement relative thereto.

9. Apparatus as recited in claim 7 where at least some of said links of said lazy tongs linkage have matched therewith a similar link which is parallel thereto and has common pivotal connections.

10. Apparatus as recited in claim 7 wherein the first said angle is between 0° and 15°.

11. Apparatus as recited in claim 7 wherein the last said angle is between 75° and 90°.

12. An expandable support structure comprising
at least two lazy tongs linkages each having at least eight links and arranged with corresponding links parallel and spaced apart by a predetermined structure width,
a plurality of elongated planks arranged perpendicular to said linkages, each end of one edge of each said plank being pivotally connected to a respective lazy tongs linkage near a lower endwise junction of two of said links, there being two adjacent planks so pivotally connected near the same said endwise junction, the pivotal axes of said planks being parallel to their longitudinal axes, and
further links connected to the ends of the other edges of said planks and to an upper endwise junction of links of said lazy tongs linkages to cause said planks to be supported in a nearly coplanar array when said lazy tongs linkage is expanded and to cause said two adjacent planks to rotate oppositely through less than about a 90° angle as said linkage is contracted.

13. Apparatus as recited in claim 12 wherein alternate ones of the lower endwise junctions of said lazy tongs links each have two planks pivotally connected coaxially with said junction.

14. Apparatus as recited in claim 12 wherein the last said means includes a link connected between said planks and connected to an upper endwise junction of two of said lazy tongs links with limited sliding movement relative thereto.

15. Apparatus as recited in claim 12 where at least some of said links of said lazy tongs linkage have matched therewith a similar link which is parallel thereto and has common pivotal connections.

16. Apparatus as recited in claim 12 wherein said angle is between 60° and 90°.

17. Apparatus as recited in claim 12 wherein said angle is between 75° and 90°.

* * * * *